United States Patent
Klein et al.

(10) Patent No.: US 7,752,063 B2
(45) Date of Patent: Jul. 6, 2010

(54) METHOD AND SYSTEM FOR SECURITIZING MORTALITY RISK

(75) Inventors: Ronald Klein, Closter, NJ (US); Brian Lo, Hoboken, NJ (US)

(73) Assignee: Swiss Reinsurance Company, Zurich (CH)

( * ) Notice: Subject to any disclaimer, the term of this patent is extended or adjusted under 35 U.S.C. 154(b) by 1689 days.

(21) Appl. No.: 10/903,897

(22) Filed: Jul. 29, 2004

(65) Prior Publication Data

US 2006/0026092 A1     Feb. 2, 2006

(51) Int. Cl.
*G06Q 40/00*     (2006.01)
(52) U.S. Cl. .......................................................... 705/4
(58) Field of Classification Search ...................... 705/4
See application file for complete search history.

(56) References Cited

U.S. PATENT DOCUMENTS 6,615,180 B1 * 9/2003 Anderton et al. ............... 705/4
2005/0234821 A1 * 10/2005 Benham et al. ............... 705/40

OTHER PUBLICATIONS

Pandemic fears may trigger more securitizations. Colleen McCarthy. Business Insurance. vol. 43, issue 38, p. 19.*
Modeling Mortality with Jumps: Applications to Mortality Securitization. The Journal of Risk and Insurance. Sep. 2009. Hua Chen and Samuel H. Cox.*
Insurance: Mathematics and Economics. On age-period-cohort parametric mortality rate projections. Steven Haberman, Arthur Renshaw.*

* cited by examiner

*Primary Examiner*—Alexander Kalinowski
*Assistant Examiner*—John O Preston
(74) *Attorney, Agent, or Firm*—Oblon, Spivak, McClelland, Maier & Neustadt, L.L.P.

(57) ABSTRACT

Methods and apparatus, including computer systems, are provided for securitizing a mortality risk. A premium is received by an issuer from a counterparty, and the issuer provides coverage of a mortality risk to the counterparty. An investment is received by the issuer from an investor, and the issuer provides a risk instrument to the investor. The risk instrument provides a contingent return of the investment to the investor, where if a first condition is satisfied then the entire investment is returned, if a second condition is satisfied then none of the investment is returned, and if neither the first nor the second conditions are satisfied then a portion of the investment is returned. The first and second conditions are related to the mortality risk.

17 Claims, 5 Drawing Sheets

| Index Weighting by Gender ||
|---|---:|
| Gender | Weighting |
| Male | 65.0% |
| Female | 35.0% |

FIG. 2A

| Index Weighting by Age ||
|---|---:|
| Age Band | Weighting |
| 20-24 | 1.0% |
| 25-29 | 5.0% |
| 30-34 | 12.5% |
| 35-39 | 20.0% |
| 40-44 | 20.0% |
| 45-49 | 16.0% |
| 50-54 | 12.0% |
| 55-59 | 7.0% |
| 60-64 | 3.0% |
| 65-69 | 2.0% |
| 70-74 | 1.0% |
| 75-79 | 0.5% |

FIG. 2B

Historical Analysis (since 1906)

| Date | Event | Approximate Index Impact |
|------|-------|--------------------------|
| 1918 | Influenza Pandemic | 33.2% |
| 1940 | World War II | 6.5% |
| 1917 | World War I | 3.0% |
| 1995 | AIDS (worst year) | 3.0% |
| 1956 | Influenza Epidemic | NM |
| 2001 | World Trade Center Attack | NM |
| 2003 | SARS | NM |

US 7,752,063 B2

METHOD AND SYSTEM FOR SECURITIZING MORTALITY RISK

TECHNICAL FIELD

This invention relates to securitizing a mortality risk.

BACKGROUND

Insurance is coverage by a contract binding a party to indemnify another against a specified loss in return for premiums paid. Life insurance is a specific type of insurance contract where the specified loss is loss of life, i.e, death, of the insured life. To assess the likelihood of death of an insured life, for example, to set premiums, insurers can refer to mortality data provided by agencies, e.g., the US Centers for Disease Control and Prevention and the National Center for Health Statistics. The data is released on an annual basis, although there is typically a reporting lag of up to two years. The available information is typically provided for age bands for each sex.

Certain events that have health related consequences, such as natural disasters, wars or disease outbreaks, can cause unexpected increases in mortality rates. For example, the influenza pandemic of 1918 caused an approximate 33% increase in the mortality rate over the previous year, and World War II caused an increase in the mortality rate of 6.5%. Such unexpected increases in mortality rates are typically unpredictable by insurers.

Reinsurance is coverage by a contract binding a issuer to indemnify an insurer against a specified loss in return for premiums paid. Insurers can spread their risk by contracting with issuers, to thereby receive coverage in whole or in part for the risk the insurer has incurred in insuring someone else.

SUMMARY

This invention relates to securitizing a mortality risk. In general, in one aspect, the invention features method and apparatus, including computer systems, for securitizing a mortality risk. A premium is received by an issuer from a counterparty, and the issuer provides coverage of a mortality risk to the counterparty. An investment is received by the issuer from an investor, and the issuer provides a risk instrument to the investor. The risk instrument provides a contingent return of the investment to the investor, where if a first condition is satisfied then the entire investment is returned, if a second condition is satisfied then none of the investment is returned, and if neither the first nor the second conditions are satisfied then a portion of the investment is returned. The first and second conditions are related to the mortality risk.

Implementations of the invention can feature one or more of the following. Income can be generated from the investment and an interest return on the risk instrument can be paid to the investor using the investment income. Additionally, the premium received from the counterparty can be provided to the investor.

The first condition can be satisfied if a mortality index for a covered region for a risk period is equal to or less than a threshold value, and the second condition can be satisfied if the mortality index is greater than the threshold value. Alternatively, the first condition can be satisfied if a mortality index for a covered region for a risk period is equal to or less than a first threshold value and the second condition can be satisfied if the mortality index is greater than a second threshold value, where the second threshold value is greater than the first threshold value. The mortality index can be a weighted adjustment of a mortality rate for the covered region for the risk period, the weighted adjustment based on a demographic profile of a group covered for the mortality risk by the counterparty.

One or more risk classes can be established, where each risk class represents a different mortality risk. Providing coverage of a mortality risk to the counterparty can include providing coverage of a mortality risk represented by a risk class. Providing a risk instrument to the investor can include providing a risk instrument to the investor where the return of the investment to the investor is contingent on the realization of the mortality risk represented by the risk class. The first and second conditions are related to the mortality risk presented by the risk class.

Implementations of the invention can realize one or more of the following advantages. Securitizing mortality risk gives counterparties, such as life insurers, an alternative to the conventional reinsurance market. Mortality bonds are fully collateralized, so that payment in the event of a triggering event is guaranteed. Using a mortality index to determine a trigger event that can be calculated from data weighted by country, age and/or gender allows the secured mortality risk to reflect the mortality risk of an insured population. Using publicly available mortality data to define trigger events frees the counterparty from disclosing information about its risk portfolio that may be required for loss-based triggers.

Issuing mortality bonds at recurring intervals can give counterparties regular access to the capital markets, providing stable, multi-year coverage for mortality risk. Issuance at regular intervals can also provide a regular supply of mortality bonds to those markets, making the mortality bond market more reliable, and therefore more attractive, to investors. Establishing classes of mortality bonds that can be issued on a recurring basis can reduce transaction costs associated with each mortality bond issuance.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2A is a table illustrating a weighting by gender.

FIG. 2B is a table illustrating a weighting by age band.

Like reference symbols in the various drawings indicate like elements.

DETAILED DESCRIPTION

Figure 1A:
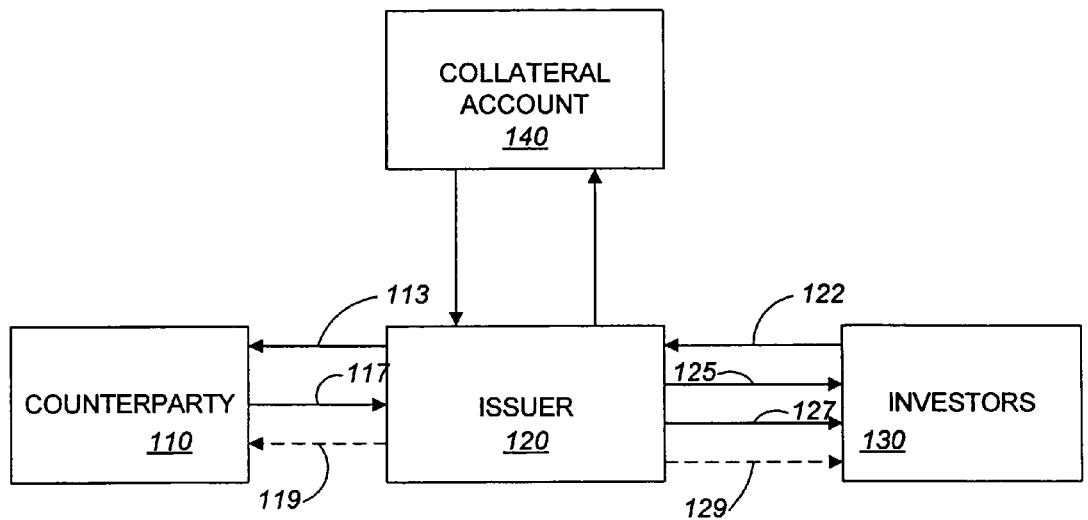
FIG. 1A is a block diagram schematically illustrating a mortality bond transaction.

FIG. 1A is a block diagram schematically illustrating a mortality bond transaction, in accordance with one implementation of the invention. An issuer 120 receives a premium 117 from a counterparty 110 in exchange for securing the counterparty 110 against an unexpected increase in a mortality rate for a risk period. That is, if certain conditions are met during a risk period, which conditions relate to an increase in the mortality rate, the issuer 120 agrees to make an event payment 119 to the counterparty 110. In one scenario, the counterparty 110 is a corporation, insurer or reinsurer, and the issuer 120 is a special purpose vehicle, e.g., an independent, charitably owned entity in an offshore location, that is established for the purpose of issuing the mortality bond.

The issuer 120 receives an investment 122 from one or more investors 130 and in exchange provides a risk instrument 125 to each investor 130, which will be referred to as a "mortality bond". During a risk period, the investors 130 accrue an interest return 127 on their investment 122, including a distribution of the premiums 117 paid by the counterparty 110 to the issuer 120. If the conditions are met during a risk period wherein the issuer is obligated to make an event payment 119 to the counterparty 110, then the investors 130 may receive back a return 129 of only a portion or none of their investment 122 from the issuer at the end of the risk period. If the conditions are not met during the risk period, then the investors 130 receive back a return 129 of their entire investment 122 at the end of the risk period.

Figure 1B:
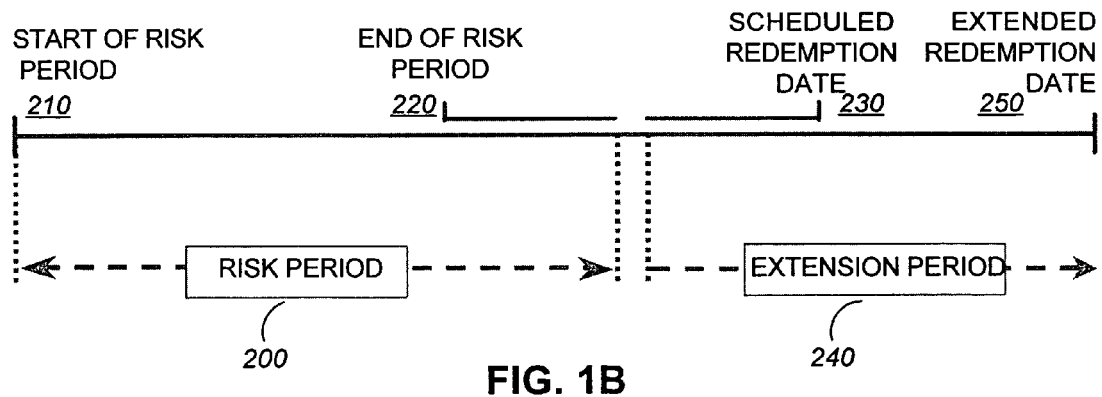
FIG. 1B illustrates a timeline for one implementation of a mortality bond transaction according to FIG. 1A.

FIG. 1B shows a schematic representation of a timeline of the risk instrument 125. The risk instrument 125 is issued from the issuer 120 to an investor 130, typically at the start of the risk period 210. The risk period 200 can be any period of time, for example, a period of three years. A risk period 200 of three years includes three risk years, and terminates at the end of the risk period 220. A redemption date 230 is scheduled on either the same date as the end of the risk period 220 or shortly thereafter. The scheduled redemption date 230 is the date the issuer is obligated to return all, a portion or none of the investment 122 to the investors 130, depending on whether the conditions are met during the risk period 200.

The conditions relate to an increase in a mortality rate. Mortality data for a given year is generally not available for two years following. Accordingly, there can be a lag time of approximately two years to determine whether or not a condition was met for a given risk year within the risk period 200. An extension period 240 therefore may be required to allow time to determine whether or not a condition is met. The issuer's 120 obligation to return all, a portion or none of the investment 122 back to the investors 130 is thereby extended to an extended redemption date 250 coinciding with the end of the extension period 240.

The issuer 120 invests the investment 122 received from the investors 130 in a collateral account 140, e.g., a trust account, during the risk period. Income generated from the collateral account 140 can be used to pay an interest return 127 to the investors 130, and the principal invested in the collateral account 140 can be used to pay the investment out to either or both of the counterparty 110 and the investors 130, depending on whether the conditions are met during the risk period. The interest return 127 can be paid to investors 130 periodically, e.g., quarterly. In one implementation, the collateral account finds are invested in a secure investment, e.g., AAA rated securities that provide a relatively risk-free return (e.g., at the London Interbank Offered Rate (LIBOR)).

Optionally, the issuer 120 may enter into additional agreements to ensure that a return will be available for periodic payments to the investors 130. For example, a highly rated third party can act as a guarantor by swapping a LIBOR based return in exchange for the actual return on the invested amount, which the third party manages.

The conditions during the risk period that determine whether the investment 122 is paid out to the counterparty 110 in whole or in part, or is returned to the investors 130 in whole or in part, relate to the mortality risk secured by the issuer 120. In one implementation, to determine whether a mortality rate has exceeded a threshold amount during a risk year, a mortality index is calculated with respect to the risk year. The mortality index can be calculated based on mortality rates of more than one country. Mortality data is generally available by gender and by multiple age bands. Accordingly, a mortality index that is weighted based on one or more factors including country, age and sex, can be tailored to reflect the demographic profile of the counterparty's risk position.

In one example, the mortality index features wide geographic diversification encompassing approximately 325 million individuals from 5 countries, using the following weighting:

| Country | Weight |
|---|---|
| United States | 70.0% |
| United Kingdom | 15.0% |
| France | 7.5% |
| Italy | 5.0% |
| Switzerland | 2.5% |

The weighting based on gender and age can be as shown in FIGS. 2A and 2B. For example, a gender weighting can be female 35% and male 65%, and an age weighting can be based on 5-year age bands for ages ranging from 20 to 79 years.

In one implementation, the mortality index is calculated according to the following formula:

$$\text{Index} = \sum_j a_j \sum_i \left( b^m w_i q_{i,j}^m + b^f w_i q_{i,j}^f \right)$$

where:
$a_j$ is the weight for country j;
$b^m$ is the gender weighting for males;
$b^f$ is the gender weighting for females;
$w_i$ is the weight for age band i;
$q_{i,j}^m$ is the observed deaths per 100,000 for males from country j and age band i; and
$q_{i,j}^f$ is the observed deaths per 100,000 for females from country j and age band i.

Calculating the mortality index using the above formula can better reflect the mortality rate of an insured population, as compared to the population at large. Other techniques for calculating a mortality rate or index can be used, and the above formula is exemplary of one implementation.

Figure 3:
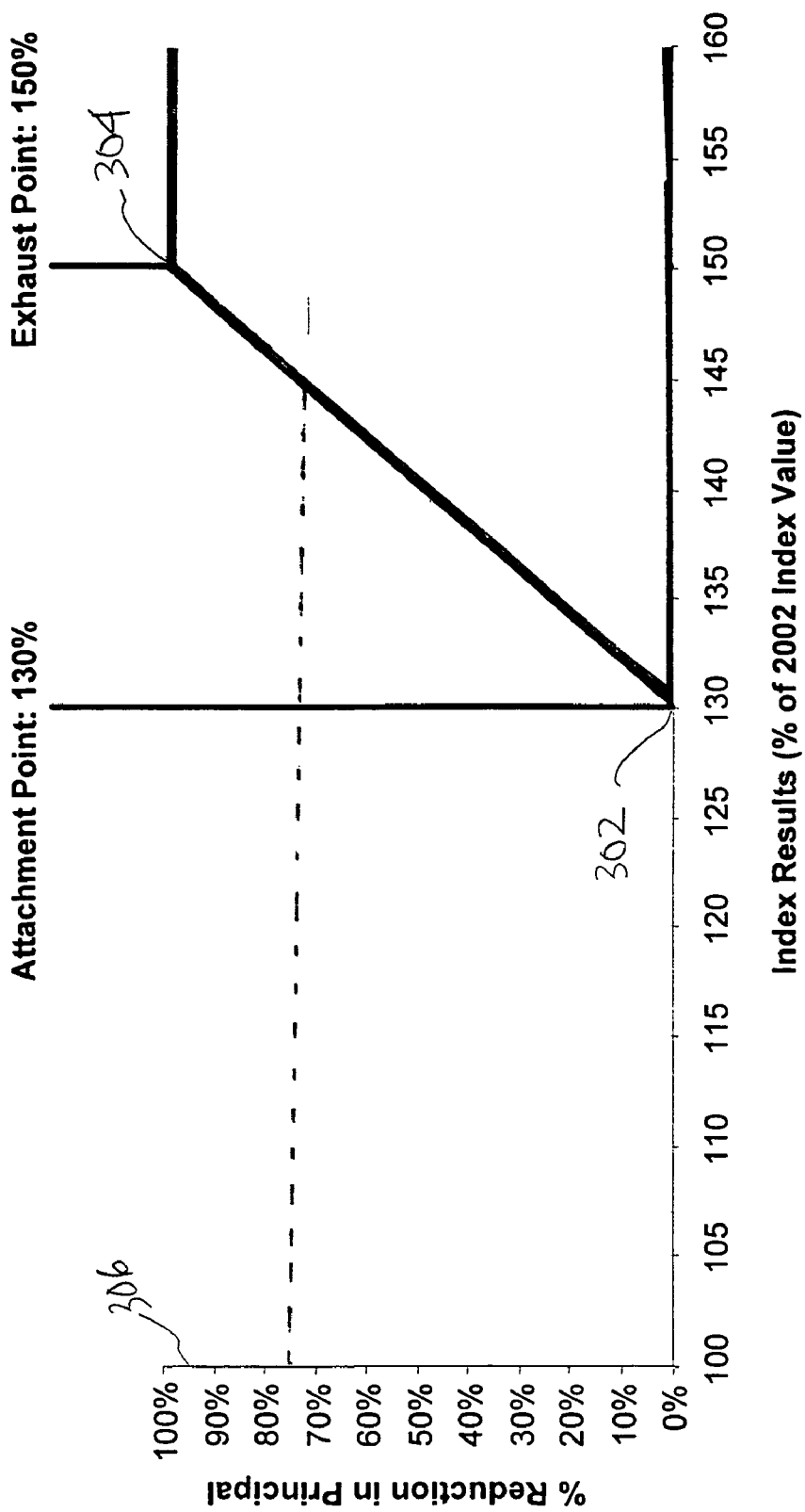
FIG. 3 is a graph showing the relationship between the percentage of reduction in investment and the mortality index for a risk year for one implementation of a mortality bond.

FIG. 3 illustrates one implementation of conditions for a mortality bond. If the mortality index for a given population for a risk year, i.e., a year during the risk period, increases by an amount exceeding a first threshold value as compared to the mortality index for the given population for a selected base year, e.g., the previous year, then a first condition is met. In FIG. 3, the first threshold value 302 is a 30% increase in the mortality index over the mortality index of a base year, in the current example, the year 2002. That is, if the mortality index for the risk year is 130% of the base index, then a first condition based on the first threshold value is satisfied. If the mortality index for the risk year meets or exceeds a second threshold value 304, in the present example a 50% increase in the mortality index, an exhaustion point is met and a second condition is satisfied.

The vertical axis 306 of the graph shown in FIG. 3 indicates the percentage of reduction in investment. At the exhaustion point 304 the investment 122 obligated to be returned to the investors 130 by the issuer 120 is reduced by 100%, meaning the investors 130 will not receive a return of any of the investment 122. Between the first threshold value 302 and the second threshold value 304 there is a linear relationship between the increase in the mortality index for the risk year as compared to the mortality index of a base year and the percentage of reduction in investment.

That is, at the first threshold value 302, the reduction in investment is 0%, meaning the entire investment 122 will be returned to the investors 130 at the end of the risk period. Once the first threshold value 302 is exceeded, the investment amount that will be returned to the investors 130 starts to decrease. For example, if the mortality index for the risk year is 145% of the mortality index of the base year, then the investment is reduced by 75%. That is, the issuer 120 is obligated to return only 25% of the investment 122 to the investors 130. At the exhaustion point 304, that is, once the second threshold value 304 is met or exceeded, the investment is reduced by 100%, and the issuer 120 is not obligated to return any of the investment 122 to the investors 130.

The relationship of the percentage of reduction in investment to the mortality index for a risk year shown in FIG. 3 is illustrative of one implementation. Other relationships are possible, including: using different values as the first and second threshold values; having a non-linear relationship between the first and second threshold values 302, 304; using a single threshold value that can be an exhaustion point (i.e., an all or nothing approach); or using a series of threshold values providing a stepped relationship between a first and last threshold value. Other relationships can be used.

Figure 4:
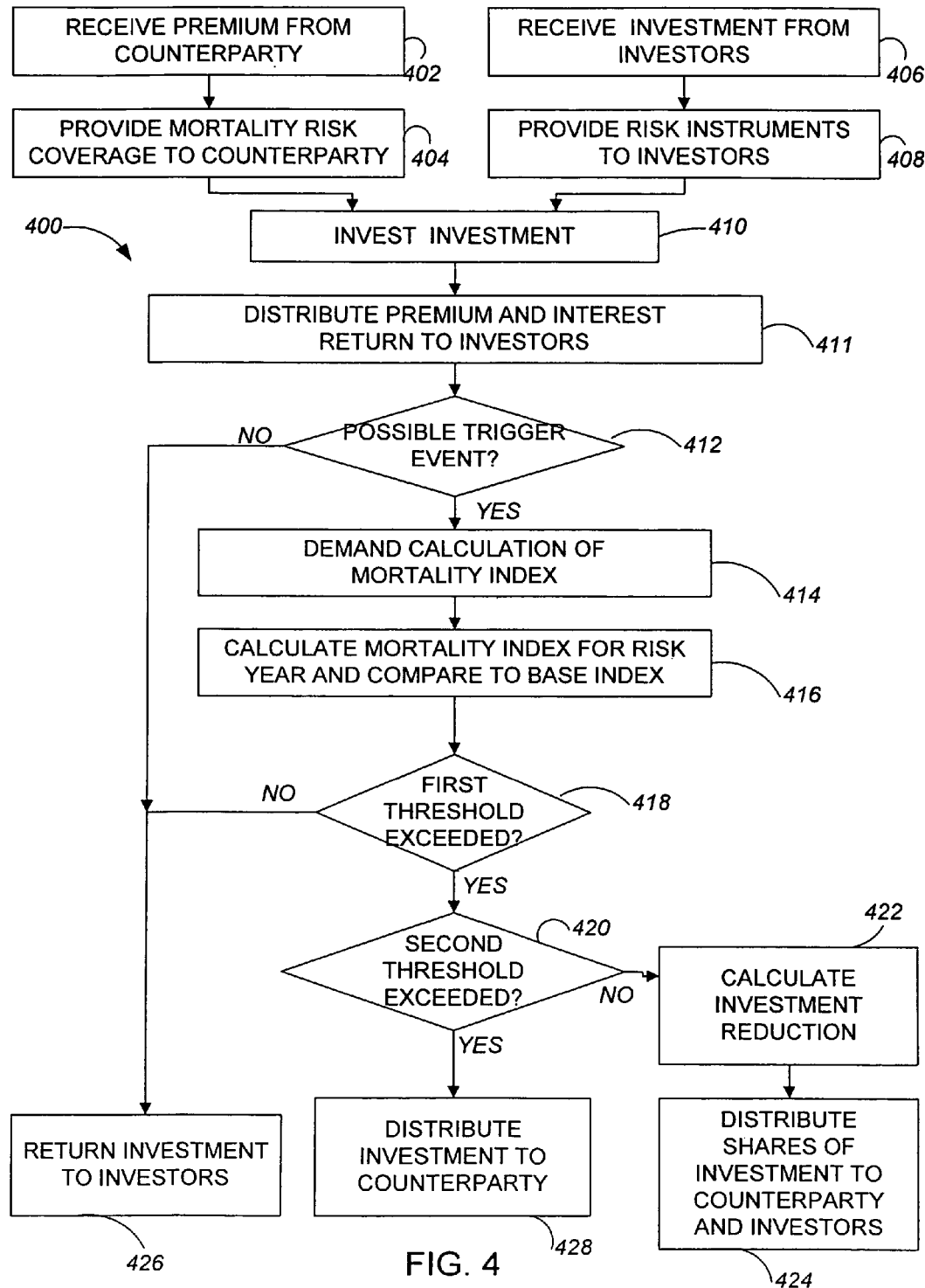
FIG. 4 is a flowchart showing a process for a mortality bond transaction.

FIG. 4 is a flowchart showing a process 400 for providing reinsurance coverage to a counterparty in exchange for a premium 117 and a risk instrument 125 to one or more investors in exchange for an investment 122. By way of illustration, an example shall be described using the process 400 shown in the flowchart. In the example, the issuer 120 receives a premium 117 in the amount of $10K from a counterparty 110 (step 402). The premium 117 can be paid periodically, e.g., quarterly, or as a single installment. The counterparty 110 is an insurer that provides life insurance coverage. In exchange, the issuer 120 agrees to provide mortality risk coverage to the counterparty 110 (step 404). The mortality risk coverage is defined by the calculation used to assess the increase in a mortality rate, e.g., the mortality index formula discussed above, and the one or more conditions that must be satisfied to trigger an event payment 119. That is, if the mortality index for a covered risk year exceeds the mortality index for a base year by a threshold value, then the issuer 120 agrees to provide an event payment 119 to the counterparty 110. The amount of the event payment 119 does not necessarily bear any direct or indirect relation to losses, if any, actually incurred by the counterparty 110 as a result of the increased mortality rate.

In the example, the issuer 120 agrees to provide mortality risk coverage for a period of three years. Referring again to FIG. 3, if the mortality index for any one of the three risk years is more than 130% of the mortality index of the base year 2002, then the issuer 120 agrees to provide an event payment 119 to the counterparty 110. The amount of the event payment 119 depends on how much the mortality index for the risk year exceeds the base year 2002. If the mortality index for the risk year exceeds the mortality index of the base year by a second threshold value 304 of 50% or more, i.e., the mortality index is 150% or more of the base index, then the event payment 119 reaches a maximum possible value. The amount of the event payment 119 if the mortality index for the risk year exceeds the first threshold value 302 but not the second threshold value 304 is determined by a linear relationship between the first and second threshold values 302, 304.

The issuer 120 receives an investment 122 from one or more investors 130 (step 406). In exchange, the issuer 120 provides the one or more investors 130 with a risk instrument 125 (step 408). The risk instrument 125 has a scheduled redemption date that is on or shortly after the date of the end of the risk period. In the example, the investment is $100K. The start of the risk period is Jan. 1, 2004 and the end of the risk period is Dec. 31, 2006. The scheduled redemption date is Feb. 1, 2007. The issuer 120 agrees to provide an interest return 127 to the investors 130 on income generated (if any) from an investment of the investment 122, and to provide the premiums 117 received from the counterparty 110 to the investors 130, during the risk period. That is, the investors 130 are entitled to receive an interest return 127 generated on an invested amount of $100K as well as a distribution of the $10K premium received from the counterparty 110. The interest return 127 can be paid to the investors 130 periodically throughout the risk period or on the scheduled redemption date. The issuer 120 further agrees to provide a return 129 of all, some or none of the investment 122 to the investors 130 on the scheduled redemption date, depending on the mortality index for the risk years during the risk period.

The issuer 120 invests the investment 122 of $100K received from the investors 130 into a collateral account 140 (step 410). The interest return 127, including the premium distribution, can be paid out periodically, e.g., quarterly, to the investors 130 (step 411). At the end of each risk year during the risk period, a determination is made as to whether a possible trigger event occurred during the risk year (step 412). A trigger event is an event that causes the mortality index for the risk year to exceed the mortality index of the base year by more than the first threshold value 302.

Figures 5A, 5B:
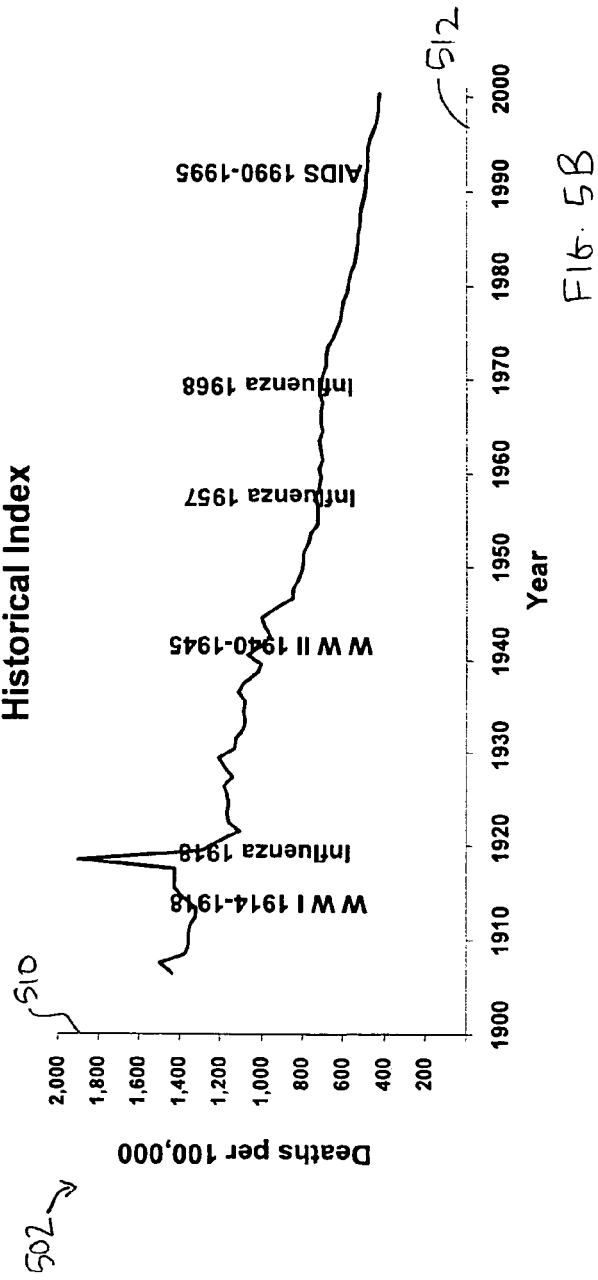
FIG. 5A is a table showing historic events and their impact on a mortality rate.
FIG. 5B is a graph illustrating the data set forth in the table of FIG. 5A.

For example, in FIGS. 5A and 5B a table 500 and a graph 502 are shown illustrating the impact of some historical events on a mortality index. The table 500 shows a date in a first column 504, an event in a second column 506, and the approximate impact of the event on a mortality index in a third column 508. The graph 502 charts the deaths per 100,000 persons on a vertical axis 510 against a timeline on a horizontal axis 512 to provide a visual representation of the impact of the events on the mortality rate. The influenza pandemic of 1918 is the only event that caused the mortality index to increase by more than 30% over the mortality index of a previous year, i.e., that caused a mortality index to have a value of more than 130% of the mortality index of the previous year, thereby exceeding the first threshold value 302 of the present example. If the influenza pandemic occurred during a risk year in the present example, the influenza pandemic would qualify as a trigger event. Other events that resulted in increased mortality rates, e.g., World Wars I and II, caused some increase in the mortality index, but not enough to qualify as a trigger event. Multiple events that occur in a single risk year can be a trigger event in combination, so long as the combined impact of the events on the mortality index exceeds a first threshold value.

In one implementation, if the counterparty 110 suspects a trigger event may have occurred during the preceding risk year ("Yes" branch of decision step 412), the counterparty 110 can within a predetermined time frame, e.g., 30 days, demand a calculation of the mortality index for the risk year (step 414). By setting the scheduled redemption date on Feb. 1, 2007, which is more than 30 days after the end of the risk period on Dec. 31, 2006, the counterparty 110 is given time after the end of the final risk year of 2006 to make a demand for a calculation of the mortality index for the risk year 2006 if there is reason to suspect a trigger event occurred. In such a circumstance, the scheduled redemption date can be extended by an extension period to an extended redemption date, so as to allow time to calculate the mortality index for the risk year, since mortality data may not be available for up to two years following. During the extension period the issuer 120 can continue to invest the investment 122 and provide an interest return 127 to the investors 130.

Once the mortality data necessary to determine the mortality index for the risk year is available, the mortality index is calculated and compared to the base index (step 416). A determination is made as to whether the mortality index for the risk year exceeds the first threshold value 302, i.e., whether the mortality index of the risk year is more than 130% of the mortality index of the base year (step 418). If the first threshold value 302 is exceeded ("Yes" branch of decision step 418), then a determination is made as to whether the second threshold value 304 is exceeded (step 420). In the present example, the mortality index for the risk year is 145% the mortality index of the base year. Accordingly, the first threshold value 302 is exceeded ("Yes" branch of decision step 418) and a first condition is satisfied, but the second threshold value 304 is not exceeded ("No" branch of decision step 420) and a second condition is not satisfied.

A calculation is made based on the mortality index of the risk year to determine the percentage of investment reduction (step 422). For example, the following formula can be used to determine the percentage of investment reduction, which formula reflects the linear relationship illustrated in FIG. 3 between the first and second threshold values 302, 304:

$$\% \text{ Loss} = 100\% \times \frac{(\text{Index Value} - \text{First Threshold Value})}{(\text{Second Threshold Value} - \text{First Threshold Value})}$$

On either the scheduled redemption date or the extended redemption date (depending on which risk year the trigger event occurred in and when the relevant mortality data was available), the counterparty 110 receives an event payment 119 of a share of the investment 122, and the investors 130 receive a return 129 of a share of the investment 122 (step 424). In one implementation, the amount of the event payment 119 due to the counterparty 110 from the issuer 120 is equal to the amount by which the investment 122 that is returned to the investors 130 is reduced, e.g., based on the formula shown above and the graph shown in FIG. 3. That is, for a mortality index of 145% the mortality index of the base year, the percentage of reduction in the investment is 75%. The return 127 to the investors 130 of their investment 122 is reduced by 75%, and is therefore $25K rather than the full amount of $100K. The amount by which the investment 122 is reduced, i.e., $75K, is the amount of the event payment 119 from the issuer 120 to the counterparty 110 under the terms of the mortality risk coverage provided by the issuer 120 to the counterparty 110. In other implementations, the amount of the event payment 19 due to the counterparty 110 can be different than the amount by which the investment returned to the investors 130 is reduced.

If the mortality index for the given risk year did not exceed the first threshold value 302 ("No" branch of decision step 418), i.e., the suspected trigger event turned out not to be a trigger event, then the issuer 120 provides a return 129 of the entire investment 122 of $100K to the investors 130 on the scheduled or extended redemption date (step 426). By contrast, if the mortality index for the given risk year exceeded the second threshold value ("Yes" branch of decision step 420), then, in one implementation, the issuer 120 provides an event payment 119 equaling the entire investment 122 of $100K to the counterparty 110, and does not return any of the investment 122 to the investors 130 (step 428).

In addition to returning all, some or none of the investment 122 to the investors 130, the issuer 120 is obligated to provide the investors 130 the premiums 117 collected from the counterparty 110 and an interest return 127 of income generated (if any) on the invested investment 122. For example, if over the risk period the invested $100K earns 10% interest per annum, then the investors 130 shall receive either a periodic payment of the interest amount, e.g., $10K per annum, or may receive a lump-sum payment of accrued interest (which may or may not be compounded) on the scheduled or extended redemption date. Additionally, the $10K premium collected from the counterparty 110 is distributed to the investors 130. In one implementation, the issuer 120 does not guarantee a rate of return on the investment 122, and it may be possible that no interest is generated during the risk period.

A risk period including more than one risk year, e.g., the three-year risk period in the present example, can have trigger events occurring in more than one of the risk years. By way of illustrative example, a trigger event can occur in the first risk year, resulting in a percentage of reduction in investment of 50%. A second trigger event can occur in the second risk year, resulting in a percentage of reduction in investment of 25%. Accordingly, at the end of the risk period, the total percentage of reduction in investment is 75%. The investors 130 therefore only receive back a return 129 of 25% of their investment 122, and the counterparty 110 receives an event payment 119 totaling 75% of the investment 122. The maximum total percentage of reduction in investment is 100%.

A class of mortality bonds can be issued as more than one series of mortality bonds. A class can represent the risk of occurrence of one or more trigger events, such as in the example above, the risk of the mortality index increasing by more than 30% over a base index and risk of the mortality index increasing by more than 50% over a base index. Another class can represent a different mortality risk, for example, having a first threshold value of 120% and a second threshold value of 130%. The second class therefore represents a higher risk of occurrence, since the mortality rate increases necessary for a trigger event are lower than in the first class. A third class can represent a mortality risk where there is a single threshold value, e.g., 140%, and if the mortality index is less than or equal to 140% of a base index, then there is no trigger event, and if the mortality index is greater than 140% of a base index, then there is a trigger event. The single threshold value can represent an exhaustion point, i.e., a 100% reduction in investment.

Each class of mortality bonds can be issued as more than one series. That is, risk instruments of a given class can be issued from time to time on a recurring basis in additional series for each class. Additional series can be issued at predetermined intervals, e.g., on a quarterly basis. The predetermined intervals can be established when the risk classes are established, or at the time of an initial issuance or placement of risk instruments of one or more risk classes. Alternatively, a program can be established such that a counterparty 110 and/or a issuer 120 have the option of issuing additional series of risk instruments at any time. In either case, the counterparty 110 and/or issuer 120 can have the option to issue additional series of risk instruments or not, based on market conditions, e.g., the need for additional coverage or investor demand. Each series of a given class can be issued by the same issuer 120, which optionally can have different cells or units for each issuance. Alternatively, each class, or each series, can be issued by a different issuer 120, e.g., a special purpose vehicle established for the class or for the particular series.

The terms of each risk instrument can vary according to the class of risk, the length of the risk period, and the market conditions at the time of issuance. Each risk instrument in a given class, that is, instruments of any series of a given class, share the same underlying risk, i.e., the same risk of an increase in the mortality index, and can be subject to identical terms ("class terms"), except that certain terms ("series terms"), e.g., the issuance date, interest spread, scheduled redemption date, etc., may be different for each series of a class. The size of each placement can also vary, depending on market conditions e.g., the counterparty's need for additional coverage and investor demand.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. The logic flow depicted in FIG. 4 does not require the particular order shown, or sequential order, to achieve desirous results, and the steps of the invention can be performed in a different order. Accordingly, other embodiments are within the scope of the following claims.

What is claimed is:

1. A computer system, comprising:
a means for generating records of a securitizing transaction in which coverage of a mortality risk is provided to a counterparty by an issuer, including recording the receipt of a premium from the counterparty;
a means for generating records of an issuance of a risk instrument from the issuer to an investor, including recording the receipt of an investment by the issuer from the investor where the risk instrument provides a contingent return of the investment to the investor;
a means for determining whether a first condition is satisfied, a second condition is satisfied or if neither the first nor the second conditions are satisfied, where the first and second conditions are related to the mortality risk; and
a means for determining the amount of the contingent return of the investment to the investor and the amount of an event payment to the counterparty according to the determined conditions, where the amount of the contingent return or the event payment can be zero,
wherein the mortality index is a weighted adjustment of a mortality rate for a covered region for a risk period, the weighted adjustment based on a demographic profile of a group covered for the mortality risk by the counterparty, and
means for calculating the mortality index according to the following formula:

$$MortalityIndex = \sum_{j} a_j \sum_{i} \left( b^m w_i q_{i,j}^m + b^f w_i q_{i,j}^f \right)$$

where:
$a_j$ is the weight for country j;
$b^m$ is the gender weighting for males;
$b^f$ is the gender weighting for females;
$w_i$ is the weight for age band i;
$q_{i,j}^m$ is the observed deaths per 100,000 for males from country j and age band i; and
$q_{i,j}^f$ is the observed deaths per 100,000 for females from country j and age band i,
wherein the first condition is satisfied if the mortality index for the covered region for the risk period is equal to or less than a threshold value and the second condition is satisfied if the mortality index is greater than the threshold value.

2. The system of claim 1, wherein the first condition is satisfied if the mortality index for a covered region for a risk period is equal to or less than a first threshold value and the second condition is satisfied if the mortality index is greater than a second threshold value, where the second threshold value is greater than the first threshold value.

3. A method of securitizing a mortality risk implemented by an apparatus including special purpose logic circuitry configured to securitize the mortality risk, comprising:
receiving, by the apparatus including the special purpose logic circuitry, a premium from a counterparty;
providing, by the apparatus including the special purpose logic circuitry, coverage of a mortality risk to the counterparty;

receiving, by the apparatus including the special purpose logic circuitry, an investment from an investor; and providing, by the apparatus including the special purpose logic circuitry, a risk instrument to the investor, the risk instrument providing a contingent return of the investment to the investor, where if a first condition is satisfied then the entire investment is returned, if a second condition is satisfied then none of the investment is returned, and if neither the first nor the second conditions are satisfied then a portion of the investment is returned, and where the first and second conditions are related to the mortality risk, wherein the mortality index is a weighted adjustment of a mortality rate for a covered region for a risk period, the weighted adjustment based on a demographic profile of a group covered for the mortality risk by the counterparty; and calculating, by the apparatus including the special purpose logic circuitry, the mortality index according to the following formula:

$$MortalityIndex = \sum_j a_j \sum_i \left( b^m w_i q_{i,j}^m + b^f w_i q_{i,j}^f \right)$$

where:
$a_j$ is the weight for country j;
$b^m$ is the gender weighting for males;
$b^f$ is the gender weighting for females;
$w_i$ is the weight for age band i;
$q_{i,j}^m$ is the observed deaths per 100,000 for males from country j and age band i; and
$q_{i,j}^f$ is the observed deaths per 100,000 for females from country j and age band i,
wherein the first condition is satisfied if the mortality index for the covered region for the risk period is equal to or less than a threshold value and the second condition is satisfied if the mortality index is greater than the threshold value.

4. The method of claim 3, further comprising:
generating income from the investment; and
paying an interest return on the risk instrument to the investor using the investment income.

5. The method of claim 3, further comprising:
providing the premium received from the counterparty to the investor.

6. The method of claim 3, wherein the first condition is satisfied if the mortality index for a covered region for a risk period is equal to or less than a first threshold value and the second condition is satisfied if the mortality index is greater than a second threshold value, where the second threshold value is greater than the first threshold value.

7. The method of claim 3, further comprising:
establishing one or more risk classes, each risk class representing a different mortality risk; wherein:
providing coverage of a mortality risk to the counterparty comprises providing coverage of a mortality risk represented by a risk class; and
providing a risk instrument to the investor comprises providing a risk instrument to the investor where the return of the investment to the investor is contingent on the realization of the mortality risk represented by the risk class and the first and second conditions are related to the mortality risk presented by the risk class.

8. A method for securitizing a mortality risk implemented by an apparatus including special purpose logic circuitry configured to securitize a mortality risk, comprising:
receiving, by the apparatus including the special purpose logic circuitry, a premium from a counterparty;
providing, by the apparatus including the special purpose logic circuitry, coverage of a mortality risk to the counterparty;
receiving, by the apparatus including the special purpose logic circuitry, an investment from an investor; and
providing, by the apparatus including the special purpose logic circuitry, a risk instrument to the investor, the risk instrument providing a contingent return of the investment to the investor, where:
if a mortality index for a covered region for a risk period is less than a first threshold value, then the investor is provided a return of the entire investment;
if the mortality index for the covered region for the risk period is greater than a second threshold value, then the counterparty is provided the entire investment; and
if the mortality index for the covered region for the risk period is greater than the first threshold value and less than the second threshold value, then the investor and the counterparty are each provided a share of the investment,
wherein the mortality index is a weighted adjustment of a mortality rate for a covered region for a risk period, the weighted adjustment based on a demographic profile of a group covered for the mortality risk by the counterparty, and
calculating, by the apparatus including the special purpose logic circuitry, the mortality index according to the following formula:

$$MortalityIndex = \sum_j a_j \sum_i \left( b^m w_i q_{i,j}^m + b^f w_i q_{i,j}^f \right)$$

where:
$a_j$ is the weight for country j;
$b^m$ is the gender weighting for males;
$b^f$ is the gender weighting for females;
$w_i$ is the weight for age band i;
$q_{i,j}^m$ is the observed deaths per 100,000 for males from country j and age band i; and
$q_{i,j}^f$ is the observed deaths per 100,000 for females from country j and age band i.

9. The method of claim 8, further comprising:
generating income from the investment; and
paying an interest return on the risk instrument to the investor using the investment income.

10. The method of claim 8, further comprising:
providing the premium received from the counterparty to the investor.

11. The method of claim 8, further comprising:
establishing one or more risk classes, each risk class representing a different mortality risk; wherein:
providing coverage of a mortality risk to the counterparty comprises providing coverage of a mortality risk represented by a risk class; and
providing a risk instrument to the investor comprises providing a risk instrument to the investor where the return of the investment to the investor is contingent on the realization of the mortality risk represented by the risk class and the first and second conditions are related to the mortality risk presented by the risk class.

12. The method of claim 11, further comprising:
issuing a first series of risk instruments of a first risk class of the one or more risk classes; wherein:
providing a risk instrument to the investor comprises providing a risk instrument from the first series of risk instruments.

13. The method of claim 12, wherein issuing the first series of risk instruments includes issuing the first series of risk instruments on a first issue date, the method further comprising:
issuing a second series of risk instruments of the first risk class on a second issue date, the second issue date being after the first issue date.

14. A method of securitizing a mortality risk implemented by an apparatus including special purpose logic circuitry configured to securitize a mortality risk, comprising:
establishing, by the apparatus including the special purpose logic circuitry, one or more risk classes, each risk class representing a mortality risk and each risk class being issuable as risk instruments providing a return on an investment, the amount of the return for a risk instrument being contingent upon the occurrence of a trigger event for the corresponding represented mortality risk; and
issuing, by the apparatus including the special purpose logic circuitry, one or more risk instruments of a first risk class of the one or more risk classes,
wherein the mortality index is a weighted adjustment of a mortality rate for a covered region for a risk period, the weighted adjustment based on a demographic profile of a group covered for the mortality risk by the counterparty, and
calculating, by the apparatus including the special purpose logic circuitry, the mortality index according to the following formula:

$$MortalityIndex = \sum_j a_j \sum_i \left(b^m w_i q_{i,j}^m + b^f w_i q_{i,j}^f\right)$$

where:
$a_j$ is the weight for country j;
$b^m$ is the gender weighting for males;
$b^f$ is the gender weighting for females;
$w_i$ is the weight for age band i;
$q_{i,j}^m$ is the observed deaths per 100,000 for males from country i and age band i; and
$q_{i,j}^f$ is the observed deaths per 100,000 for females from country j and age band i.
wherein a trigger event occurs if the mortality index for a covered region for a risk period exceeds a first threshold value
an exhaustion event occurs if the mortality index for the covered region for the risk period exceeds a second threshold value; and the amount of the return for the risk instrument is a portion of the investment if a trigger event occurs and an exhaustion event does not occur and the amount of the return for the risk instrument is zero if an exhaustion event occurs.

15. The method of claim 14, further comprising:
issuing a first series of risk instruments of a first risk class of the one or more risk classes.

16. The method of claim 15, wherein issuing the first series of risk instruments includes issuing the first series of risk instruments on a first issue date, the method further comprising:
issuing a second series of risk instruments of the first risk class on a second issue date, the second issue date being after the first issue date.

17. A computer readable storage medium encoded with instructions, which when executed by a computer causes the computer to implement a method of securitizing a mortality risk comprising:
receiving a premium from a counterparty;
providing coverage of a mortality risk to the counterparty;
receiving an investment from an investor; and
providing a risk instrument to the investor, the risk instrument providing a contingent return of the investment to the investor, where if a first condition is satisfied then the entire investment is returned, if a second condition is satisfied then none of the investment is returned, and if neither the first nor the second conditions are satisfied then a portion of the investment is returned, and where the first and second conditions are related to the mortality risk,
wherein the mortality index is a weighted adjustment of a mortality rate for a covered region for a risk period, the weighted adjustment based on a demographic profile of a group covered for the mortality risk by the counterparty; and
calculating, at the apparatus including the special purpose logic circuitry, the mortality index according to the following formula:

$$MortalityIndex = \sum_j a_j \sum_i \left(b^m w_i q_{i,j}^m + b^f w_i q_{i,j}^f\right)$$

where:
$a_j$ is the weight for country j;
$b^m$ is the gender weighting for males;
$b^f$ is the gender weighting for females;
$w_i$ is the weight for age band i;
$q_{i,j}^m$ is the observed deaths per 100,000 for males from country j and age band i; and
$q_{i,j}^f$ is the observed deaths per 100,000 for females from country j and age band i,
wherein the first condition is satisfied if the mortality index for a covered region for a risk period is equal to or less than a threshold value and the second condition is satisfied if the mortality index is greater than the threshold value.

* * * * *